US012565720B1

(12) United States Patent
Park

(10) Patent No.: US 12,565,720 B1
(45) Date of Patent: Mar. 3, 2026

(54) MANUFACTURING METHOD OF RECYCLED POLYESTER YARN USING WASTE FABRIC

(71) Applicants: SAM BU FINE CHEMICAL CO., LTD., Gimhae-si (KR); Heedae Park, Busan (KR)

(72) Inventor: Heedae Park, Busan (KR)

(73) Assignees: Heedae Park, Busan (KR); SAM BU FINE CHEMICAL CO., LTD., Gimhae-si (KR)

( * ) Notice: Subject to any disclaimer, the term of this patent is extended or adjusted under 35 U.S.C. 154(b) by 0 days.

(21) Appl. No.: 18/840,487

(22) PCT Filed: Feb. 15, 2024

(86) PCT No.: PCT/KR2024/095226

§ 371 (c)(1),
(2) Date: Aug. 21, 2024

(87) PCT Pub. No.: WO2024/196205

PCT Pub. Date: Sep. 26, 2024

(30) Foreign Application Priority Data

Mar. 17, 2023 (KR) ........................ 10-2023-0034921

(51) Int. Cl.
| | |
|---|---|
| *B29B 9/06* | (2006.01) |
| *B29B 13/10* | (2006.01) |
| *B29B 17/04* | (2006.01) |
| *B29C 71/02* | (2006.01) |
| *C08G 63/89* | (2006.01) |
| *C08G 63/91* | (2006.01) |
| *D01D 1/04* | (2006.01) |
| *D01D 5/08* | (2006.01) |
| *D01D 5/088* | (2006.01) |
| *D01F 1/10* | (2006.01) |
| *D01F 6/62* | (2006.01) |
| *D01G 11/04* | (2006.01) |
| *D02G 3/02* | (2006.01) |
| *B29B 17/00* | (2006.01) |
| *B29K 67/00* | (2006.01) |
| *B29K 105/26* | (2006.01) |

(52) U.S. Cl.
CPC ............. *D01G 11/04* (2013.01); *C08G 63/89* (2013.01); *C08G 63/91* (2013.01); *D01D 5/088* (2013.01); *D01F 6/62* (2013.01); *D02G 3/02* (2013.01); *B29B 2017/001* (2013.01);

*B29B 2017/0015* (2013.01); *B29K 2067/00* (2013.01); *B29K 2067/003* (2013.01); *B29K 2105/26* (2013.01); *D10B 2331/04* (2013.01)

(58) Field of Classification Search
CPC ..... B29B 9/06; B29B 13/10; B29B 2017/001; B29B 2017/0015; B29B 17/04; B29C 71/02; B29K 2067/00; B29K 2067/003; B29K 2105/26; D01D 1/04; D01D 5/08; D01F 1/10; D01F 6/62; D10B 2331/04
USPC .... 264/140, 141, 142, 143, 176.1, 211, 234, 264/913
See application file for complete search history.

(56) References Cited

U.S. PATENT DOCUMENTS 4,003,880 A * 1/1977 Sidebotham ............ B29B 17/02
264/913 X

FOREIGN PATENT DOCUMENTS

| | | | |
|---|---|---|---|
| CN | 105839199 A | * | 8/2016 |
| JP | 05-148716 A | | 6/1993 |
| KR | 10-2010-0087578 A | | 8/2010 |
| KR | 10-2011-0078934 A | | 7/2011 |
| KR | 10-1197724 B1 | | 11/2012 |
| KR | 10-1313351 B1 | | 10/2013 |
| KR | 10-2014-0091868 A | | 7/2014 |
| KR | 10-2183241 B1 | | 11/2020 |
| KR | 10-2021-0019159 A | | 2/2021 |
| KR | 10-2022-0034027 A | | 3/2022 |

OTHER PUBLICATIONS

Translation of CN 105839199 A (published on Aug. 10, 2016).*

* cited by examiner

*Primary Examiner* — Leo B Tentoni
(74) *Attorney, Agent, or Firm* — Goldilocks ZONE IP Law

(57) ABSTRACT

The present invention relates to a method for manufacturing a recycled polyester yarn using waste fabric. The method includes steps of: adding a predetermined chain extender to a polyester resin in which waste fabric woven with polyester yarn is melted to prevent the viscosity of the melted recycled polyester resin from dropping, and by adding a low melting point alloy agent having low melting point and low crystallinity, thereby improving extrusion (workability) in a process of melting and spinning the recycled polyester yarn and having physical properties equivalent to virgin polyester yarn.

2 Claims, 2 Drawing Sheets

MANUFACTURING METHOD OF RECYCLED POLYESTER YARN USING WASTE FABRIC

CROSS-REFERENCE TO RELATED APPLICATIONS

This application claims the benefit under 35 U.S.C. section 371, of PCT International Application No. PCT/KR2024/095226, filed on Feb. 15, 2024, which claims foreign priority to Korean Patent Application No. 10-2023-0034921, filed on Mar. 17, 2023, in the Korean Intellectual Property Office, both of which are hereby incorporated by reference in their entireties.

TECHNOLOGY FIELD

The present invention relates to a method of manufacturing recycled polyester yarn using waste fabric, and more specifically, to prevent a decrease in viscosity by adding a chain extender to recycled polyester resin obtained by melting waste fabric woven from polyester yarn. The present invention relates to a method for producing a recycled polyester yarn using waste fabrics having properties equivalent to virgin polyester yarn, as well as improved extrudability in the process of melt spinning recycled polyester yarn by adding a low melting point alloy agent to control the properties of the recycled polyester resin.

BACKGROUND

Polymer synthetic resins, which are commonly used as plastics, are increasing in demand in various product groups in modern society. These synthetic resins are produced in large quantities, but they are also mass-produced, causing environmental pollution due to industrialization, that is, waste problems that do not decompose, and they are at a level that poses serious threats to treatment costs and ecosystems.

In this regard, in terms of environmental protection and recycling of resources, the use of degradable synthetic resins or the recycling of waste synthetic resins has increased, and efforts have been made to implement the separation and discharge of plastics, reduce the use of disposable plastics, and establish an efficient plastic collection process. At the same time, research has been continuously conducted to reduce the amount of carbon generated and to produce environmentally friendly recycled plastics with high quality.

Among them, polyester resin is not only a widely used synthetic fiber material due to its excellent mechanical properties, chemical stability, and high melting point, but it is also a very important polymer material as a material for various plastic products. It is mainly used as a thin film or a thin film made of polyethylene terephthalate (PET), which is used as a film, a container, and an optical element. Because of excellent processability of the PET, transparency, heat resistance and electrical properties and good dimensional stability even at high temperatures, attempts have been made to improve physical properties and productivity by synthesizing PET with high polymerization and low carboxyl content in a shorter time.

To date, many methods have been proposed for producing new fibers by crushing and granulating polyester-based fibers or fabrics, processing them into polyester chips, and then melting the chips for use in polyester fabrics. However, the conventional typical recycling method, there are many difficult problems related to productivity and economics due to the use of expensive hydrolysers, environmental pollution such as wastewater discharge, expensive energy use, and complex process conditions.

As shown above, the recycling method of simply extruding waste polyester to produce polyester chips as a method of recycling waste polyester has the problem of not being suitable as a textile material because the range of applicable products is narrow due to color discoloration, foreign substance mixing, viscosity deterioration, etc. In addition, the method of regeneration through depolymerization of waste polyester is to mix waste polyester and ethylene glycol and melt it to depolymerize, so the physical properties of recycled polyester are excellent, but productivity is reduced, and recycling costs are expensive, and there are serious problems such as color deterioration and dyeing defects due to long-term depolymerization.

As a representative related art for the manufacture of recycled polyester yarn by such physical and/or chemical methods, Korean Published Patent Application No. 10-2010-0087578 discloses the steps of melting recovered polyester recovered from fibers, films, bottle moldings, and the like; filtering said melted polyester with a filter to remove foreign matter, coarse inorganic particles, denatured resin, and the like; extruding said filtered melt to make recycled polyester pellets; drying said recycled polyester pellets and mixing them with regular polyester for melt kneading in a biaxial extruder; and spinning said melt mixture to provide a recycled polyester fiber and a method for producing the same.

Korean Patent No. 10-1197724 includes a step of mixing waste polyester flakes and ethylene glycol (EG) in a molar ratio of 1.0:0.1 to 1.0, pressurizing said melted mixture at 1.5 to 2.5 kg/cm$^3$ and melting under pressure and stirring at 10~50 rpm for 3-4 hours, and the melted mixture is then pressurized to 2.0~2.5 kg/cm$^3$ under pressure and stirred at 30-70 rpm at 245-260° C. using nitrogen (N$_2$) gas and depolymerized to 1.0-2.0 hours to depolymerize to produce bis-2-hydroxyethyl terephthalate (BHET); filtering the bis-2-hydroxyethyl terephthalate (BHET) produced by the depolymerization process through a filter of 600 to 2000 mesh to remove foreign matter; and polycondensation to polymerize the bis-2-hydroxyethyl terephthalate (BHET) under vacuum to produce polyester; a regenerating polyester chip manufacturing step of manufacturing the regenerating polyester manufactured by the polycondensation process into a chip; and a chip mixing step of mixing the regenerating polyester chip in accordance with a color; a spinning process for spinning the recycled polyester chips to produce a partially oriented yarn (POY); and a drawtexturing process for using said partially oriented yarn to produce a draw textured yarn (DTY).

Furthermore, Korean Patent No. 10-2183241 relates to a polyester fiber with excellent dexterity and a method for manufacturing the same, which comprises: a step of melting waste polyester; a first filtration step of filtering the melted polyester with a mesh filter; a second filtration step of secondarily filtering the filtered polyester with a candle filter; and a fibrous step of fiberizing the secondarily filtered polyester.

Korean Patent No. 10-2022-0034027, a multicomponent fiber comprising a first component comprising polyester (wherein at least 80 wt % of the polyester is recycled polyester) and having a melting point MP1; and a second component comprising polyester (wherein at least 80 wt % of said polyester is recycled polyesters) and having a melting point MP2, wherein MP2 is lower than or equal to MP1, wherein said second component comprises polyester and a melting point depressant additive and wherein said melting point depressant additive is a glycol.

Sources for recycling such polyester waste fabrics may classify (1) pre-consumer sources that recycle waste fabric such as scrap generated during the manufacturing of yarns, fabrics, shoes, and other articles and (2) post-consumer sources, which are recycled products recovered after the end of the purpose of use of the products, such as clothes, automobile upholstery, household goods, etc. In the present invention, a method for obtaining high quality and environmentally friendly recycled polyester yarn from sources such as the pre-consumer sources and the post-consumer sources has been researched and developed.

DETAILED DESCRIPTION OF THE INVENTION

Problems to be Solved

The purpose of the present invention is to prevent the deterioration of the viscosity of the molten recycled polyester resin by adding a specific chain extender to the polyester resin which the waste fabric woven with polyester yarn has been melted, and to control the physical properties of the recycled polyester resin by adding a low-melting point hybrid agent with low melting point and crystallinity, thereby improving the extrusion (workability) in the process of melting and spinning the recycled polyester yarn as well as to provide a manufacturing method for recycled polyester yarn using waste fabric with properties equivalent to virgin polyester yarn.

Means for Solving the Problems

The manufacturing method of recycled polyester yarn using waste fabric according to the present invention may include: the first step of collecting waste fabric woven with polyester yarn and removing impurities; the second step of cutting and crushing the waste fabric from which the impurities removed; a third step of manufacturing a regenerated polyester pellet by putting or injecting the pulverized waste fabric into a compounder, melting the pulverized waste fabric at a temperature of 230° C.-270° C. to obtain a regenerated polyester resin, and extruding a melt in which Carbonyl bis caprolactam (CBC) is added as a chain extender in a range of 0.5-2 parts by weight based on 100 parts by weight of the melted regenerated polyester resin; the fourth step of drying the recycled polyester pellets; and a fifth step of melting and spinning the dried recycled polyester pellet into a spinner and melt-spinning the same at a temperature of 260° C. to 320° C.

According to a preferred embodiment of the present invention, in the third step, copolyester (CoPET) is further added as a mixture agent (alloy agent) in the range of 2~10 weight portion for 100 weight portion of the molten recycled polyester resin, and the copolyester (CoPET) is characterized by a density of 1.2-1.4 $g/cm^2$ and a melting point of 123-133° C.

Accordingly, the recycled polyester yarn has a tensile strength of 0.55 to 0.65 $kgf/cm^2$ and an elongation of 20 to 32%.

Effects of the Invention

The recycled polyester yarn obtained by the manufacturing method of the present invention can prevent a decrease in viscosity of the recycled polyester resin by adding a specific chain extender to the recycled polyester resin obtained by melting waste fabric woven from polyester yarn. Accordingly, the present invention can control the physical properties of the recycled polyester resin by adding an alloy agent having a low melting point and low crystallinity, thereby improving extrudability (workability) in a process of melting and spinning the recycled polyester yarn and having the same level of physical properties as virgin polyester yarn.

According to the present invention, the polyester yarn is easily regenerated from the waste fabric through the melt-alloy method which combines a chemical method and a physical method, thereby realizing cost reduction due to low costs and high productivity, and at the same time, preventing environmental pollution by recycling resources which are massively discarded.

DETAILED EMBODIMENTS OF THE PRESENT INVENTION

Figure 1:
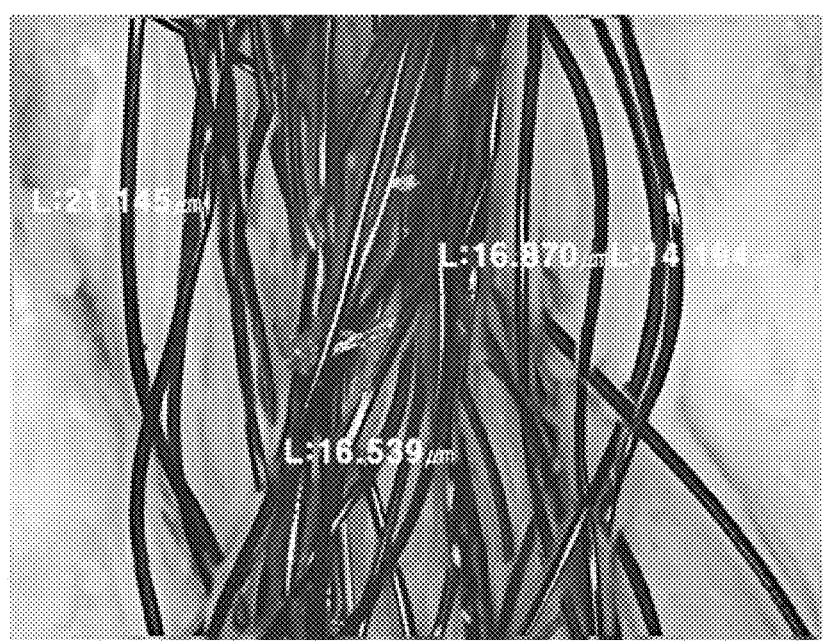
FIG. 1 is a diagram illustrating a surface state of a recycled polyester yarn prepared according to a preferred embodiment 1 of the present invention by photographing the surface state of the recycled polyester yarn.

Hereinafter, a method for manufacturing a recycled polyester yarn using a waste fabric according to the present invention is to be described. This is to illustrate the invention to be easily carried out by a person with ordinary skills in the art to which the present invention belongs, and does not imply that the technical ideas and categories of the present invention are limited.

In general, polyester resin is a general term for polymer compounds that have ester bonds (—CO—O—) through condensation polymerization with polybasic acids and polyhydric alcohols, and includes thermoplastic saturated polyesters and thermosetting unsaturated polyesters. Polyester-based synthetic fibers are produced by mixing terephthalic acid and ethylene glycol, heating them, and polymerizing the resulting material under reduced pressure to produce polyethylene terephthalate (PET).

The polyester resin is divided into unsaturated polyester resin, alkyd resin, and polyester-based synthetic fiber. The present invention refers to the use of waste fabrics made of polyethylene terephthalate (PET), a thermoplastic saturated polyester, which is a polyester-based synthetic fiber that is most commonly used in textile applications and is also widely used as an industrial material.

The market for polyethylene terephthalate (PET) is expanding due to its excellent mechanical properties and durability and its ability to be recycled. In the present invention, securing eco-friendly technology was set as a key theme while establishing verticalization and one-stop process conditions from yarn and fabric waste generated during the process to finished fabric products.

Conventional methods for recycling polyester include hydrolysis, which uses water to reduce it to monomers or oligomers, glycolysis, which uses glycols such as ethylene glycol or propylene glycol, and methanolysis, which uses methanol. these chemical methods are not only uneconomical and unproductive due to the high cost of additives, environmental pollution such as wastewater discharge, and in some cases, high energy costs due to heat treatment to increase the crystallinity of fibers, but also due to complex process conditions, such as color change and poor dyeing of fibers due to prolonged depolymerization.

Accordingly, the present invention reproduces a large amount of low-cost, high-quality polyester yarn from waste fabric by the melt-alloy method, combining chemical and physical methods, thereby realizing cost reduction due to high economy and productivity, and at the same time has the advantage of being environmentally friendly.

The method for manufacturing recycled polyester yarn using waste fabric may comprise: a first step of removing impurities by collecting waste fabric woven with polyester yarn; and a second step of cutting and pulverizing the waste fabric from which the impurities are removed; a third step of producing a recycled polyester pellet by feeding said crushed waste raw material into a compounding machine and melting it at a temperature of 230 to 270° C. to obtain a recycled polyester resin, and then extruding the melt to which carbonyl bis caprolactam (CBC) is added as a chain extender in a range of 0.5 to 2 parts by weight for 100 parts by weight of the melted recycled polyester resin; a fourth step of drying the recycled polyester pellet; and a fifth step of putting the dried recycled polyester pellet into a spinner and melting and spinning at a temperature of 260-320° C. according to an aspect of the present invention.

First, the first step is a process of removing impurities by collecting waste fabric woven with polyester yarn. The method may include the steps of: washing waste fabric woven with polyester yarn and removing impurities generated during a process of manufacturing by-products, shoes, or clothes generated during a process of manufacturing yarn and fabric; and removing impurities. a second step is a process of cutting and pulverizing the waste fabric from which the impurities are removed in an average size of 1 to 10 mm or less. The first step and the second step are preparation steps for obtaining a recycled polyester resin in a melting state.

Next, a third step is to put the above pulverized waste fabric into a compounding machine and melt it at a temperature of 230 to 270° C. to obtain a recycled polyester resin, and then extrudes the melt to which carbonyl bis caprolactam (CBC) is added as a chain extender in the range of 0.5 to 2 parts by weight for 100 parts by weight of the melted recycled polyester resin to produce a recycled polyester pellet.

The present invention is based on the principle that a chain extender, carbonyl bis caprolactam (CBC), is added in the range of 0.5 to 2 parts by weight to prevent the molecular chain of the polyester resin from being partially delaminated as the waste fabric woven from polyester yarn is melted, thereby causing the viscosity of the naturally melted recycled polyester resin to decrease, and that the chain extender reacts with the alcohol and carboxylic acid at the chain end of the polyester resin to cause a chain extension reaction, thereby increasing the intrinsic viscosity.

The process of manufacturing the recycled polyester pellet is preferably performed by using a conventional vent extruder or the like, and the recycled polyester resin melt recovered as described above is filtered with foreign substances, coarse inorganic particles, denatured resin, etc. while maintaining uniform extrusion pressure, and then extruded and cooled in a strand form and cut to produce a granular recycled polyester pellet.

In the third step, the melting point is adjusted by adding 2-10 parts by weight of Copolyester (CoPET) as an alloy agent based on 100 parts by weight of the molten recycled polyester resin, thereby reducing a defect rate to 2% or less during melt spinning to improve productivity.

As above, in the present invention, the melting point and crystallinity of the melted recycled polyester are lowered by adding copolyester (CoPET) as a low-melting point alloying agent in the range of 2 to 10 parts by weight, thereby improving workability (extrudability).) can be improved, because ordinary polyester (polyethylene terephthalate) is a crystalline polymer with excellent transparency, toughness, rigidity, and heat resistance with a melting point (Tm) of 250° C. and a glass transition temperature (Tg) of about 70° C. This is because it is difficult to control the crystallization of the recycled polyester resin used in the present invention only under processing conditions such as heating/cooling and stretching.

The copolyester (CoPET) can improve extrusion moldability of the recycled polyester yarn and can manufacture the recycled polyester yarn having the same physical properties as virgin polyester yarn by adding 2-10 parts by weight of a resin adjusted to a density of 1.2-1.4 g/cm³ and a melting point of 123° C.-133° C.

The test results testing the typical characteristics of the copolyester (CoPET) are shown in [Table 1] below.

TABLE 1

| Properties | unit | Test Results | Test method |
|---|---|---|---|
| Viscosity number | cm³/g | 80-88 | DIN 53 728 |
| Melting point(DSC) | ° C. | 123-133 | DIN 53 765 |
| Glass transition temperature(DSC) | ° C. | 0 | DIN 53 765 |
| Softening Point (Ring & Ball) | ° C. | 140 ± 20 | DIN ISO 4625 |
| Melt Flow Rate, 160° C. | g/10 min | 30 ± 5 | DIN ISO 1133 (21.6N) |
| Melting viscosity number, 160° C. | Pa · s | 330 ± 50 | (Plate/Plate) |
| Open Time | s | 8-15 | Degussa-method |
| Tensile strength | N/mm² | 25 ± 5 | DIN EN ISO 527-1/3 |
| density | g/cm³ | 1.3 ± 0.1 | DIN 53 479 |

* DSC: Differential scanning calorimetry
* DIN: Deutsche Industrie Normen

For reference, the copolyester is not simply a mechanical mixture of two or more homopolyesters, but each structural unit is bonded to each other by an ester bond. The copolyester is prepared by polymerizing homopolyesters using each component of the polyester (dibasic acid and glycol), and the melting point and crystallinity of the copolyester are lowered compared to the melting point and crystallinity of the homopolyester of the component.

It is known that the copolyester is used to improve the dyeability of polyester fibers, for example, by adding an appropriate amount of isophthalic acid to polyethylene terephthalate (PET) to form copolyester, thereby significantly improving dyeability. The present invention is based on the fact that the properties of the polyester resin are controlled by directly adding a copolyester that acts as a low melting point alloy agent with low melting point and crystallinity, and the fact that the extrudability of the recycled polyester yarn is not only improved by the melt spinning process, but also has the same level of physical properties as virgin polyester.

In contrast, melting point-reducing additives that lower the melting point of conventional polyesters are either by glycol modification of the recycled polyester or by exchanging a predetermined percentage of terephthalic acid with isophthalic acid to produce copolyesters with lower melting points, or polyesters may include a plasticizer that modifies the polymer chain to adjust the polymer properties to have a lower melting point. (see Koren Published Patent Application No. 10-2022-0034027, patent document 4). However, In order to improve the disadvantages of pollutants and economics caused by the above chemical modification method, the present invention confirms that it is possible to control the viscosity of molten polyester by securing a process technology by a physical method in which a low melting point alloy agent, Copolyester (CoPET), is added in the range of 2 to 10 parts by weight.

The fourth step is a process of drying the recycled polyester pellets. For example, the obtained recycled polyester pellets can be vacuum dried under hot air or reduced pressure to remove moisture.

Finally, the fifth step is to melt and spin the dried recycled polyester pellets into the spinner, and then melt and spin them at a temperature of 260-320° C. Aspects of the present invention aim to produce recycled polyester yarn using 100% recycled polyester pellets. After the recycled polyester master batch pellets are supplied to a metering device according to a predetermined kneading ratio, the polyester pellets manufactured by polymerizing and/or solid state polymerizing with a normal high purity raw material are measured according to the kneading ratio, and the spinning speed is controlled in a biaxial extruder, which is a melting extruder having excellent uniform kneading performance through a hopper, and then manufacturing a polyester yarn containing a recycled polyester pellet by extruding and cooling solidifying.

In the following, we will examine in detail the method of manufacturing recycled polyester yarn using waste fabric by the present invention, and explain the present invention through a desirable embodiment that can be easily carried out by a person with ordinary knowledge in the technical field to which the present invention belongs.

Embodiments of the Invention

Embodiments

1. Manufacture of Recycled Polyester Pellets
   Step 1: Waste fabrics such as fabrics, garment and footwear scraps woven with polyester yarn were collected, and foreign substances were screened and impurities removed.
   Step 2: The waste fabric from which the impurities were removed were pulverized to a size of 10 mm or less using a grinder.

weight and Copolyester (CoPET) in a range of 2-10 parts by weight as a low melting point alloying agent to 100 parts by weight of the melted recycled polyester resin, the melt was extruded to produce a recycled polyester pellet.

Step 4: the recycled polyester pellets were dried by hot air.
2. Manufacture of Recycled Polyester Yarn
A. Monofilament Yarn Production (50-350 Denier)
   Step 5-1: The recycled polyester pellet manufactured in step 4 is put into a spinning extruder, melted and extruded at a temperature of 260-300° C. (work speed: 200 m/min), and a yarn obtained by water-cooling the yarn discharged through the dies of the extruder at a temperature of 25-40° C. is stretched, and the stretched yarn is aged in a heater chamber and wound to manufacture polyester monofilament yarn having a fineness of 50-350 denier.
B. Manufacture of Multifilament Yarn (50 Denier/Filament)
   Step 5-2: The thermoplastic polyurethane pellet manufactured in step 4 is put into a spinning extruder, melted and extruded at a temperature of 260 to 320° C., and a thread obtained by air-cooling the thread discharged through the dies of the extruder at 25 to 40° C. is drawn, and the drawn thread is wound to manufacture a polyester multifilament yarn having a mono denier fineness of 50 denier/filament or less.

As described above, the specific spinning conditions in the process of manufacturing the recycled polyester yarn and the content of the chain extender and the low-melting point mixture are controlled within a range limited by the present invention according to the physical properties of the recycled polyester resin or the type of the recycled polyester yarn desired, thereby establishing a technique for manufacturing the recycled polyester yarn using waste fabric.

Experimental Examples

Figure 2:
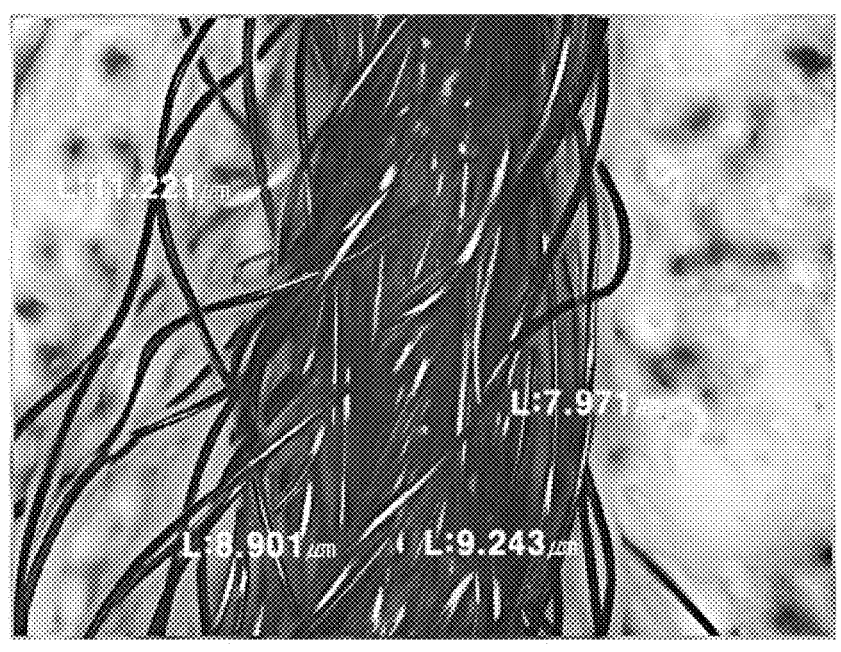
FIG. 2 is a diagram illustrating a surface state of a recycled polyester yarn prepared according to a preferred embodiment (2) of the present invention in a photograph.
Figure 3:
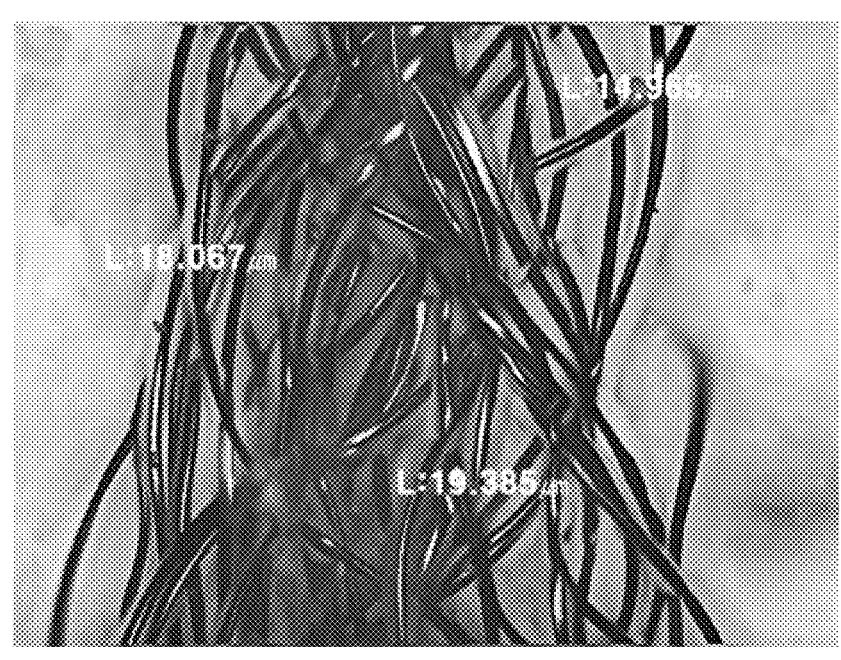
FIG. 3 is a view illustrating a surface state of a virgin polyester yarn by photographing the same.

The recycled polyester yarn (CBC 1 phr, CoPET 3 phr) manufactured according to the embodiment is subjected to a spinning process using a general O-shape of spinneret to manufacture draw textured yarn (DTY) by 150 d/48 f (example ①, FIG. 1) and 150 d/96 f (example ②, FIG. 2). In order to compare this with virgin polyester yarn (comparative example, FIG. 3), the results of several evaluations of the relative physical properties of tensile strength, elongation, unit weight, etc., are shown in Table 2 below. As a result, the surface condition of the recycled polyester yarn was found to be equally good as the virgin polyester yarn shown in FIG. 3 as shown in the illustrations shown in the photographs in FIGS. 1 and 2.

TABLE 2

| Properties | Example① (150d/48f) | Example② (150d/96f) | Comparative Examples |
|---|---|---|---|
| Tensile strength(kgf/cm³) | 0.61/0.59/0.59/0.59/0.58 | 0.64/0.61/0.62/0.61/0.63 | 0.60/0.60/0.61/0.61/0.59 |
| Elongation(%) | 29/29/29/29/27 | 27/24/26/23/26 | 22/22/22/23/21 |
| weight(g/cm) | 0.0167/0.0168 | 0.0170/0.0165 | 0.0175/0.0178 |

Step 3: The pulverized waste fabric is put into a compounder and melted at a temperature of 230 to 270° C. to obtain recycled polyester resin, and then a melt was made in which carbonyl bis caprolactam (CBC) as a chain extender was added in a range of 0.5~2 parts by As shown in Table 2, recycled polyester yarns prepared by containing CBC 1 phr and CoPET 3 phr in the examples ① and ② can show performance in tensile strength equal to or higher than that of virgin polyester yarns. In addition, the elongation rate is about 10~30% excellent that of virgin polyester yarns. Further, the unit weight was about 5~10% lighter than that of virgin polyester yarns so it was possible to produce lightweight products and found no problems such as defect rate in the spinning process. Furthermore, the recycled polyester yarn according to the examples ① and ② is expected to produce a fiber product of which overall physical properties are equal to or higher than those of virgin polyester yarns, thereby securing stability and economic efficiency in supply and demand of raw materials.

INDUSTRIAL AVAILABILITY

The recycled polyester yarn using waste fabric produced by the present invention has the advantage of being environmentally friendly and reducing the defect rate during the manufacturing process, so it is widely used in the field of fabrics used in various shoes, clothing, bags, etc., which require uniform color expression and durability. It can be used for various purposes such as sporting goods, household goods, and industrial goods such as synthetic leather and plastic products. However, it is not limited thereto.

RELATED PATENT DOCUMENTS (Patent Document 1) Korea Published Patent Application No. 10-2010-0087578 (Publication Date: Aug. 5, 2010).
(Patent Document 2) Korea Patent No. 10-1197724 (Issue date: Nov. 6, 2012).
(Patent Document 3) Korea Patent No. 10-2183241 (Issue date Nov. 26, 2020).
(Patent Document 4) Korea Published Patent Application No. 10-2022-0034027 (Publication Date: Mar. 17, 2022).

What is claimed is:

1. A manufacturing method of recycled polyester yarn using waste fabric, the method comprising:

a first step of removing impurity from the waste fabric;

a second step of pulverizing the waste fabric from which the impurities are removed;

a third step of preparing a recycling polyester pellet by putting the pulverized waste fabric into a compounder, melting the pulverized waste fabric at a temperature in a range of 230-270° C. to obtain a melted recycled polyester resin, and extruding a molten material containing in a range of 0.5-2 parts by weight of carbonyl bis caprolactam (CBC) as a chain extender by weight based on 100 parts of the melted-recycled polyester resin and in a range of 2 to 10 parts by weight of copolyester (CoPET) as a low melting point alloy agent by weight based on 100 parts of the melted-recycled polyester resin, wherein a density the CoPET is 1.2 to 1.4 $g/cm^3$ and a melting point of the CoPET is in a range of 123 to 133° C., thereby obtaining the recycled polyester pellet;

a fourth step of drying the recycled polyester pellet; and a fifth step of putting the dried recycled polyester pellet into a spinner and melt-spinning the dried recycled polyester pellet at a temperature of 260° C. to 320° C.

2. The method for manufacturing recycled polyester yarn using waste fabric of claim 1, wherein the recycled polyester yarn has tensile strength of 0.55-0.65 $kgf/cm^2$, and elongation of 20-32%.

* * * * *